United States Patent
Kazama et al.

(10) Patent No.: US 7,872,778 B2
(45) Date of Patent: Jan. 18, 2011

(54) IMAGE FORMING APPARATUS, IMAGE FORMING METHOD, AND STORAGE MEDIUM STORING PROGRAM FOR FORMING IMAGE

(75) Inventors: Toshiyuki Kazama, Kanagawa (JP); Yoshiki Matsuzaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1003 days.

(21) Appl. No.: 11/444,365

(22) Filed: Jun. 1, 2006

(65) Prior Publication Data

US 2007/0139715 A1 Jun. 21, 2007

(30) Foreign Application Priority Data

Dec. 20, 2005 (JP) ............... 2005-366439

(51) Int. Cl.
*H04N 1/00* (2006.01)
*G06K 9/40* (2006.01)

(52) U.S. Cl. ................... 358/400; 382/275

(58) Field of Classification Search ........... 358/3.26, 358/2.1, 1.9, 400, 532, 530, 3.03, 3.04, 516, 358/518; 382/309, 167, 252, 254, 266, 267, 382/275

See application file for complete search history.

(56) References Cited

U.S. PATENT DOCUMENTS

| 2003/0099411 A1* | 5/2003 | Kokemohr | 382/309 |
| 2003/0174364 A1* | 9/2003 | Goto | 358/3.26 |
| 2005/0213064 A1* | 9/2005 | Katayama et al. | 355/52 |

FOREIGN PATENT DOCUMENTS

| JP | A-2003-274143 | 9/2003 |
| JP | A-2005-117615 | 4/2005 |

* cited by examiner

*Primary Examiner*—Jerome Grant, II
(74) *Attorney, Agent, or Firm*—Morgan, Lewis & Bockius LLP

(57) ABSTRACT

An image forming apparatus includes a screen processing part that performs a screen processing on image data, a correction processing part that divides the image data subjected to the screen processing into plural regions, determines a correction parameter for each of the regions in response to a characteristic of the screen processing, and performs the correction processing, and an image formation part that forms an image based on the image data subjected to correction processing.

11 Claims, 21 Drawing Sheets

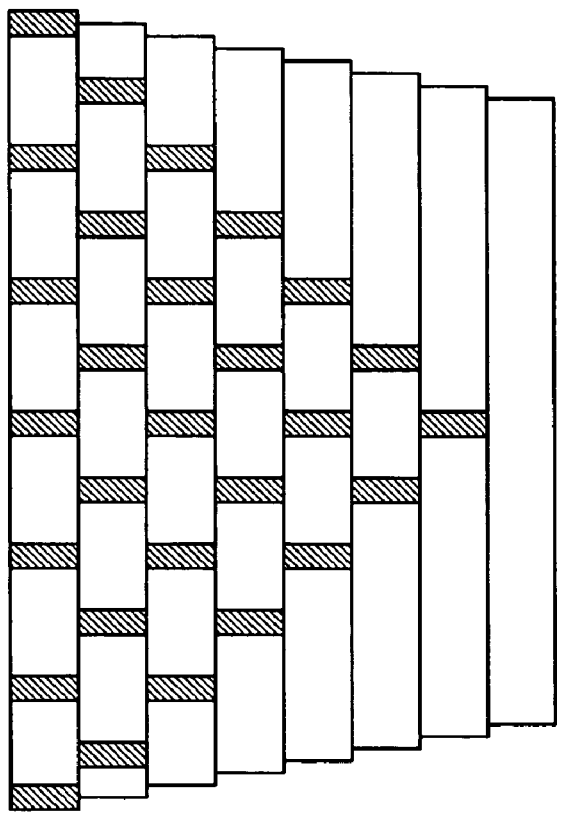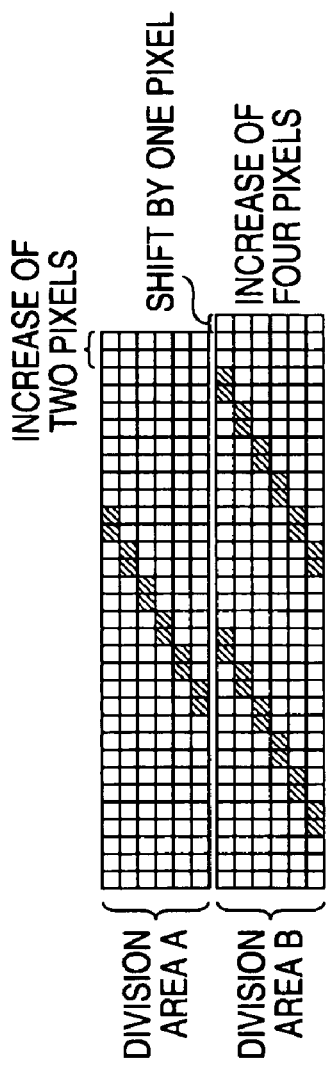
FIG. 6A
FIG. 6B

IMAGE FORMING APPARATUS, IMAGE FORMING METHOD, AND STORAGE MEDIUM STORING PROGRAM FOR FORMING IMAGE

This application claims the benefit of Japanese Patent Application No. 2005-366439 filed in Japan on Dec. 20, 2005, which is hereby incorporated by reference.

BACKGROUND

1. Technical Field

The present invention relates to an image forming apparatus, such as a printer, a copying machine or a facsimile, an image forming method and a storage medium storing a program for forming an image, and particularly to an image processing in an image forming apparatus, an image forming method and a storage medium storing a program for forming an image.

2. Related Art

In recent years, in an image forming apparatus such as a printer or a copying machine, an intermediate transfer member is often used in a transfer part. As the intermediate transfer member, a belt formed into an endless shape is generally used. Besides, transfer from a photoconductor to an intermediate transfer member is referred to as first transfer, and transfer from the intermediate transfer member to a sheet is referred to as second transfer. As a mechanism used for the second transfer, for example, a bias transfer roll (BTR) system and a bias transfer belt (BTB) system are known.

FIGS. 15A and 15B are views for illustrating a second transfer mechanism, in which FIG. 15A shows the BTR system, and FIG. 15B shows the BTB system. As shown in FIG. 15A, the BTR system is such a mechanism that an intermediate transfer member 201 is supported by a backup roll 202 from its inside, a second transfer roll 203 is brought into contact with the opposite surface, a voltage is applied therebetween, and transfer is performed. On the other hand, as shown in FIG. 15B, the BTB system is such a mechanism that instead of the opposite roll, a second transfer belt 213 made of an elastic endless belt is provided, and transfer is performed, and a poor peeling property for thin paper, which is a defect of the BTR system, is improved by causing the paper to be attracted to the belt.

The intermediate transfer member system as stated above can improve productivity and can expand the versatility of a transfer medium, and is the main stream in the transfer system of a high quality printer. However, in the image forming apparatus using the intermediate transfer member, there are plural factors to degrade the quality of an image.

For example, in the first transfer, according to a stable rotation position of an intermediate transfer belt stretched over plural rolls, the rotation direction of a photoconductor and the traveling direction of the intermediate transfer belt do not coincide with each other, and as shown in FIG. 16A, an intermediate transfer belt 16 sometimes skews with respect to photoconductor drums 152K, 152Y, 152M and 152C. As a result, as shown in FIG. 15B, an image transferred on the belt is sometimes distorted into a parallelogram. Besides, in the second transfer, as shown in FIG. 17, the stable position of the belt is changed by the entry of a sheet and the skewing of the belt sometimes occurs similarly during the transfer. Besides, since the transfer is performed while the sheet itself is rotated, an image is sometimes distorted as shown in FIG. 18.

The distortion of the image as stated above has been conventionally dealt with by providing a mechanical adjustment mechanism. For example, with respect to the skewing of the intermediate transfer belt, a mechanism is provided by which the tension of the roll over which the belt is stretched can be changed between one end and the other end in the lateral width direction of the belt, and the stable position of the belt can be changed. Besides, with respect to the rotation of the sheet at the time of second transfer, an adjustment mechanism of nip pressure is provided in the BTR system, and an adjustment mechanism between shafts on which the second transfer belt is stretched is provided in the BTB system. Both of these adjustment mechanisms require a considerably large space for mounting, and the cost is also relatively expensive.

On the other hand, in the fixing unit, heat is applied, and at the same time, force to draw the sheet is applied so far. That is, in the fixing unit, the roll is formed so that the diameter in both ends is slightly larger than that in the center, and the force to expand the sheet outward is applied. This force serves to smooth the wrinkles of the sheet. The method as stated above is a technique generally used as a countermeasure against paper wrinkles. However, by this, the sheet is slightly deformed as shown in FIG. 19, and an image on the sheet is also deformed as shown in the figure. Besides, to be exact, with respect to the influence of heat given on the sheet, the quantity of the influence is different between the leading end of the sheet and the trailing end, and as shown in FIG. 20, the width of the sheet sometimes becomes different between the leading end and the trailing end depending on moisture content distribution. Besides, by the influence of the eccentricity of the roll, as shown in FIGS. 21A and 21B, the sheet sometimes cockles.

With respect to the deformation caused in the fixing unit, in view of a trade-off with other basic performances, a positive correction has not been preformed so far.

The defect of the image as described above degrades the quality of the image, and particularly influences the registration performance in printing.

SUMMARY

According to an aspect of the invention, an image forming apparatus includes a screen processing part that performs a screen processing on image data, a correction processing part that divides the image data subjected to the screen processing into plural regions, determines a correction parameter for each of the regions in response to a characteristic of the screen processing, and performs the correction processing, and an image formation part that forms an image based on the image data subjected to correction processing.

BRIEF DESCRIPTION OF THE DRAWINGS

Exemplary embodiments of the invention will be described in detail based on the following figures, wherein:

FIGS. 6A and 6B are views for illustrating a correction processing to deal with an image deformation in a fixing unit;

DETAILED DESCRIPTION

Hereinafter, exemplary embodiments of the invention will be described in detail with reference to the drawings.

First, an image forming apparatus according to an exemplary embodiment of the invention will be described.

Figure 1:
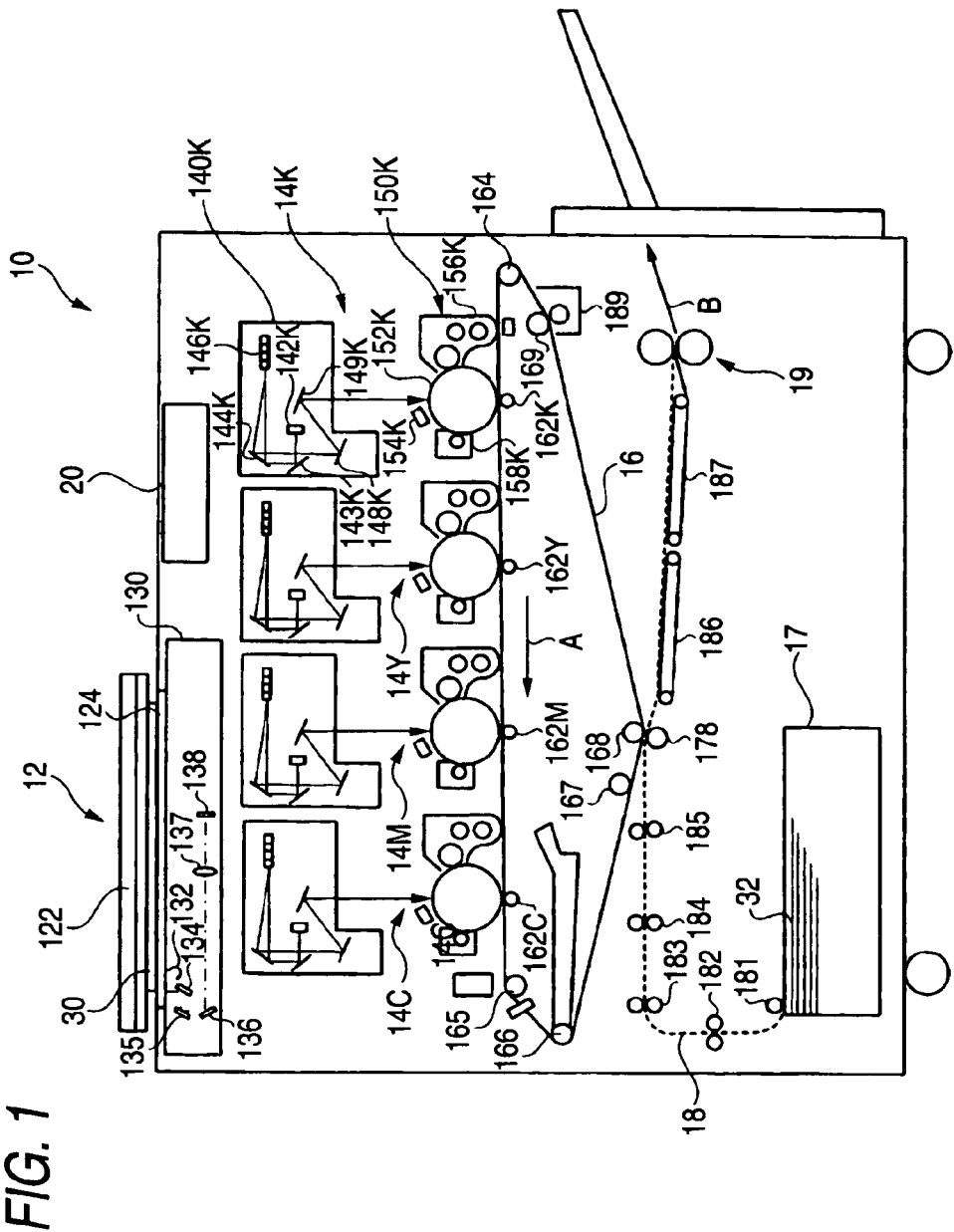
FIG. 1 is a view showing a configuration of an image forming apparatus 10 according to an exemplary embodiment of the invention.

FIG. 1 is a view showing a configuration of an image forming apparatus 10. The image forming apparatus 10 shown in the figure is, for example, a digital copying machine.

As shown in the figure, the image forming apparatus 10 includes an image read unit 12, image formation units 14K, 14Y, 14M and 14C, an intermediate transfer belt 16, a sheet tray 17, a sheet transport path 18, a fixing unit 19 and an image processing device 20.

The image read unit 12 functions as an input unit of image data, reads an image of a document 30, and outputs it to the image processing device 20. As shown in the figure, the image read unit 12 includes a platen glass 124 on which the document 30 is placed, a platen cover 122 to press the document 30 onto the platen glass 124, and an image read part 130 to read the image of the document 30 placed on the platen glass 124. The image read part 130 is configured to illuminate the document 30 placed on the platen glass 124 by a light source 132, and to read a reflected light image from the document 30 by an image read element 138 made of a CCD and the like through a reducing optical system including a full rate mirror 134, half rate mirrors 135 and 136, and an imaging lens 137.

The image processing device 20 performs a predetermined image processing on the image data inputted from the image read unit 12, and outputs it to the image formation units 14K, 14Y, 14M and 14C. That is, the image processing device 20 performs the predetermined image processing, such as shading correction, document misregistration correction, lightness/color space conversion, gamma correction, frame cancellation, or color/movement edition, on the image data read out by the image read unit 12. The details of the image processing of the invention performed in the image processing device 20 will be described later. The reflected light image of the document 30 read out by the image read unit 12 is, for example, document reflectance data of three colors of red (R), green (G) and blue (B) (8 bits for each), and is converted into document color gradation data of four colors of yellow (Y), magenta (M), cyan (C) and black (K) (8 bits for each) by the image processing of the image processing device 20.

Each of the image formation units 14K, 14Y, 14M and 14C performs image formation based on the image data of each color of black (K), yellow (Y), magenta (M) and cyan (C) inputted from the image processing device 20. Since the respective configurations of the image formation units 14K, 14Y, 14M and 14C are the same, only the configuration of the image formation unit 14K will be described below in detail.

The image formation unit 14K includes an optical scanning device 140K to scan with a laser beam according to the image data inputted from the image processing device 20, and an image formation device 150K in which an electrostatic latent image is formed by the laser beam emitted by the optical scanning device 140K.

The optical scanning device 140K emits a laser beam LB (K) modulated according to the image data of black (K) from a semiconductor laser 142K. The laser beam LB (K) emitted from the semiconductor laser 142K is radiated onto a rotating polygon mirror 146K through reflecting mirrors 143K and 144K, is deflected by the rotating polygon mirror 146K, and is radiated onto a photoconductor drum 152K of the image formation device 150K through the reflecting mirrors 144K, 148K and 149K.

The image formation device 150K includes the photoconductor drum 152K as an image carrying body rotating at a predetermined rotation speed along a direction of an arrow A, a scorotron 154K for first charging as a charging unit to uniformly charge the surface of the photoconductor drum 152K, a developer unit 156K to develop an electrostatic latent image formed on the photoconductor drum 152K, and a cleaning device 158K. The photoconductor drum 152K is uniformly charged by the scorotron 154K, and the electrostatic latent image is formed by the laser beam LB(K) emitted from the optical scanning device 140K. The electrostatic latent image formed on the photoconductor drum 152K is developed with black (K) toner by the developer unit 156K, and is transferred to the intermediate transfer belt 16. After the transfer process of the toner image, a residual toner, paper dust and the like attached to the photoconductor drum 152K are removed by the cleaning device 158K.

Similarly to the above, the other image formation units 14Y, 14M and 14C also form toner images of the respective colors of yellow (Y), magenta (M) and cyan (C), and the formed toner images of the respective colors are transferred onto the intermediate transfer belt 16.

The intermediate transfer belt 16 rotates as an intermediate transfer member in the direction of the arrow A, and the plural toner images formed by the four image formation units 14K, 14Y, 14M and 14C are superimposed with one another and are transferred (first transfer). The intermediate transfer belt 16 is stretched over a drive roll 164, plural idle rolls 165, 167 and 169, a steering roll 166, and a backup roll 168 by constant tension, and is driven at a predetermined speed in the direction of the arrow A by the drive roll 164 which is driven by a drive motor (not shown). The intermediate transfer belt 16 is formed into an endless belt shape by, for example, such a manner that a synthetic resin film of polyimide or the like having flexibility is formed into a band shape, and both ends of the synthetic resin film formed into the band shape are connected by welding or the like.

Besides, the intermediate transfer belt 16 is provided with first transfer rolls 162K, 162Y, 162M and 162C at positions opposite to the image formation units 14K, 14Y, 14M and 14C. The toner images of the respective colors formed on the photoconductor drams 152K, 152Y, 152M and 152C are transferred onto the intermediate transfer belt 16 by these first transfer rolls 162K, 162Y, 162M and 162C. A residual toner attached to the intermediate transfer belt 16 is removed by a belt cleaning device 189 provided at the downstream side of a second transfer position.

The sheet transport path 18 is for transporting the sheet from the sheet tray 17 to the fixing unit 19. A recording sheet 32 supplied from the sheet tray 17 is transported on the sheet transport path 18, the toner images of the respective colors transferred on the intermediate transfer belt 16 are transferred (second transfer) at the same time, the transferred toner images are fixed by the fixing unit 19, and the sheet is finally discharged to the outside along an arrow B. The sheet transport path 18 includes a paper feed roller 181 to take out the recording sheet 32 from the sheet tray 17, three roller pairs 182, 183 and 184 for sheet transport, and a registration roll 185 for transporting the recording sheet 32 at a predetermined timing to the second transfer position.

Besides, at the second transfer position on the sheet transport path 18, a second transfer roll 178 coming in press contact with the backup roll 168 is disposed, and the toner images of the respective colors transferred on the intermediate transfer belt 16 are second transferred onto the recording sheet 32 by the contact pressure of the second transfer roll 178 and electrostatic force. The recording sheet 32 on which the toner images of the respective colors are transferred is transported to the fixing unit 19 by transport belts 186 and 187.

The fixing unit 19 fuses and fixes the toner to the recording sheet 32 by applying a heating process and a pressurizing process to the recording sheet 32 on which the toner images of the respective colors are transferred.

Next, the functional configuration of the image processing device 20 will be described.

Figure 2:
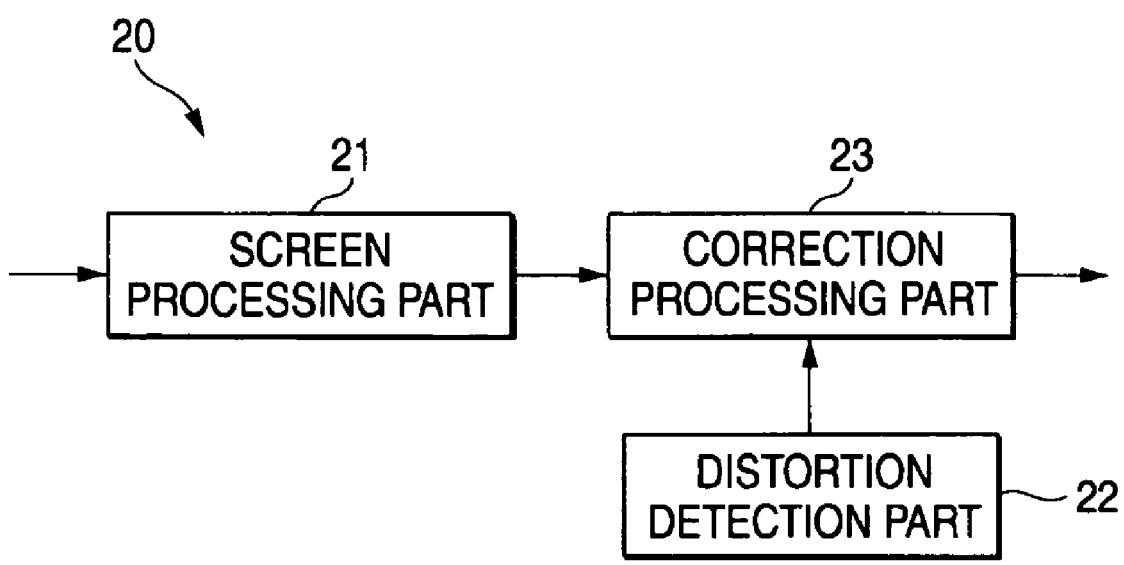
FIG. 2 is a view showing a functional configuration of an image processing device 20.

FIG. 2 is a view showing the functional configuration of the image processing device 20. The figure shows only the constituents relevant to the function.

As shown in the figure, the image processing device 20 includes a screen processing part 21, a distortion detection part 22 and a correction processing part 23.

The screen processing part 21 performs a screen processing (pseudo-halftone processing) on the inputted multi-valued image data. The screen processing part 21 performs the screen processing having screen characteristics (angle and period), which do not interfere with each other, on the image data of the respective colors, and outputs binarized image data of the respective colors to the correction processing part 23.

The distortion detection part 22 detects the distortion (deformation) in the output image formed on the sheet, and notifies the correction processing part 23 of the detection result. The distortion detection part 22 actually outputs, for example, a predetermined test pattern image, and detects the distortion of the output image based on the output result read by the image read unit 12. The distortion of the output image may be detected by reading the test pattern image formed on the sheet by an image sensor or the like provided in the image formation device 10.

The correction processing part 23 performs the correction processing on the image data inputted from the screen processing part 21 according to the characteristic of the screen processing in the screen processing part 21, and corrects the distortion of the image detected by the distortion detection part 22. That is, the image data is corrected so as to cancel the distortion of the image generated in the transfer part, the fixing part and the like.

Next, a description will be given to the correction processing performed in the image processing device 20 (correction processing part 23) in order to correct the defect of an image caused by a mechanical factor.

First, the basis of the correction processing will be described. Here, a case where image data is enlarged by inserting pixels into the original image data will be described.

Figure 3A:
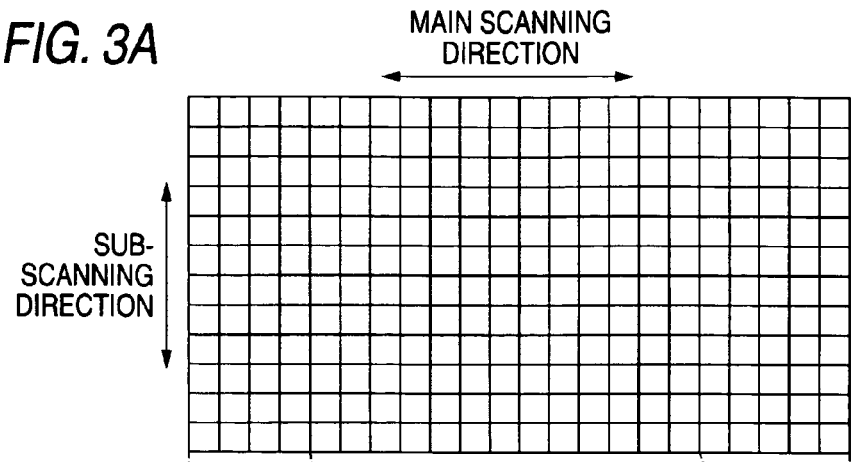
FIGS. 3A to 3C are views for illustrating an insertion method of pixels.
Figure 3B:
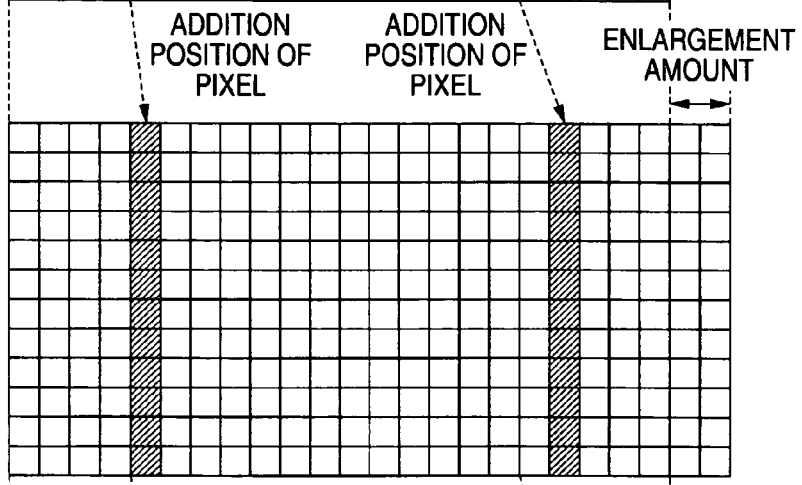
Figure 3C:
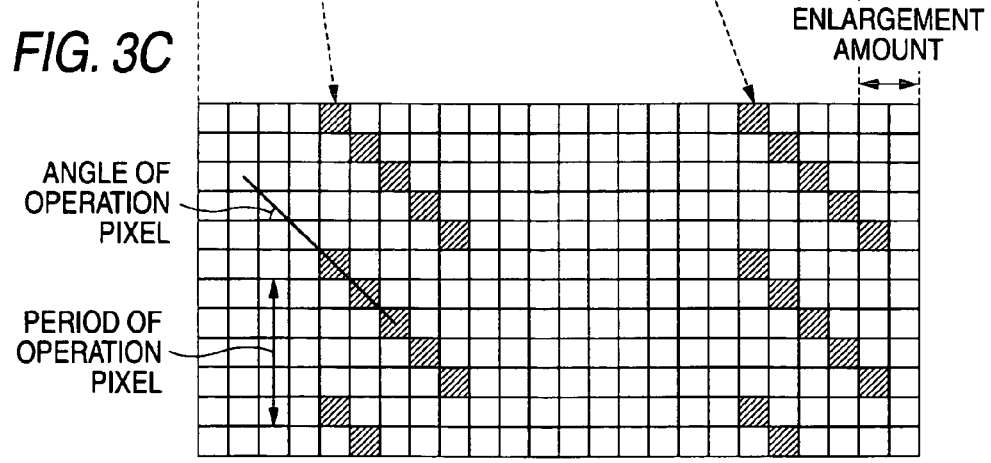

FIGS. 3A to 3C are views for illustrating an insertion method of pixels. FIG. 3A shows binarized image data, and FIGS. 3B and 3C show corrected image data in which the image data shown in FIG. 3A is enlarged in a main scanning direction through insertion of pixels.

As shown in FIG. 3B, a pixel is inserted at each main scanning line, and subsequent pixels are shifted in the main scanning direction in accordance with the insertion of the pixel, so that the image data can be enlarged. In the example shown in FIG. 3B, one pixel is inserted at each of two positions in the main scanning direction, so that the enlargement of the image data corresponding to two pixels is realized.

However, as shown in FIG. 3B, when the pixel is simply inserted at the same position on the main scanning line, it becomes visually noticeable. Then, as shown in FIG. 3C, the position of the insertion pixel is changed at a predetermined angle and period for every main scanning line. Here, the angle at which the inserted pixels are arranged and the arrangement period of the inserted pixels will be called pixel arrangement parameters.

In the example shown in the figure, although the case where the pixels are added has been described, when it is necessary to perform the reduction of an image, corrected image data is created by deleting pixels at a predetermined array position. Also in this case, as in the case shown in FIG. 3B, when pixels are simply deleted at the same position on the main scanning line, in the case where thin straight lines have existed at the deleted positions, this thin straight line disappears, and the information amount of the image is remarkably decreased. Then, actually, similarly to the case shown in FIG. 3C, the position of the pixel to be deleted is changed at a predetermined angle and period for every scanning line.

Figure 4A:
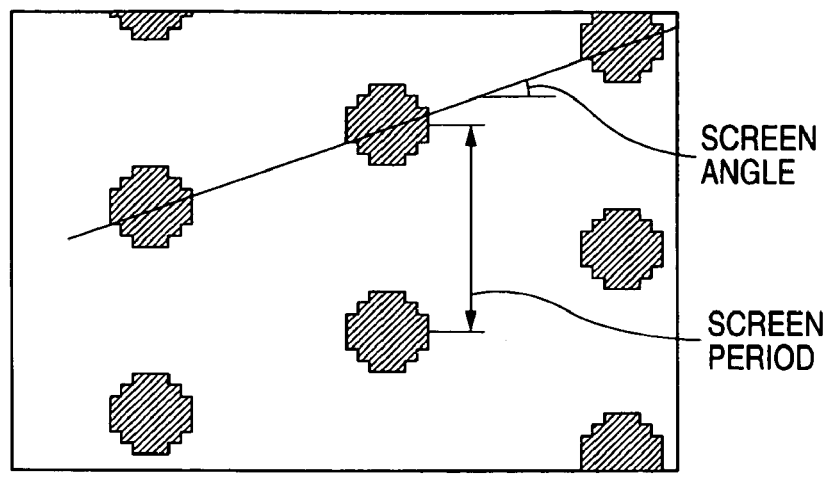
FIGS. 4A and 4B are views showing a periodic structure incorporated in an image by a screen processing.
Figure 4B:
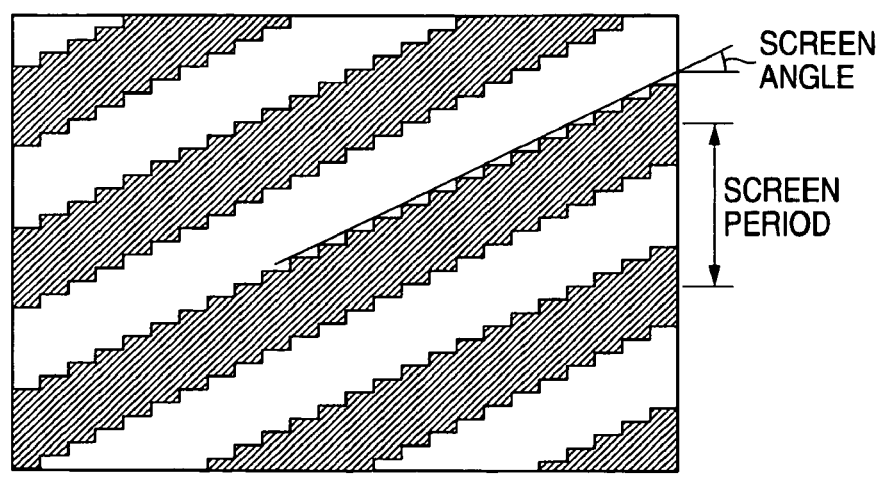

FIGS. 4A and 4B are views showing a periodic structure incorporated in an image by the screen processing.

When multi-valued image data is binarized by the screen processing part 21, the image processing device 20 performs the screen processing having the screen characteristic as shown in FIG. 4A or FIG. 4B, and enables pseudo gradation expression. The screen processing part 21 compares a dither matrix, which is made to correspond to the attribute (photographic image, graphic image, character image, etc.) of an image, with the respective pixel values of the multi-valued image data, and binarizes the multi-valued image data.

FIG. 4A shows a dot type screen. As shown in FIG. 4A, the dot type screen includes "plural points" arranged at a predetermined screen angle and a predetermined screen period. On the other hand, FIG. 4B shows a line type screen. As shown in FIG. 4B, the line type screen includes "plural lines" arranged at a predetermined screen angle and a predetermined screen period.

Accordingly, when the image processing device 20 performs the screen processing and the correction processing (pixel operation processing) in series, there is a possibility that the periodic structure incorporated by the screen processing and the operation pixels inserted or deleted periodically by the correction processing interfere with each other and an image defect such as a moire appears. For example, when an interval between screens and an interval between inserted or deleted pixel arrangements are coincident or very close to each other, they interfere with each other, and sometimes becomes visually noticeable as an image defect.

Then, in the image processing device 20 (correction processing part 23), according to the screen characteristic (screen angle, screen period, the number of screen lines or the kind of screen), an array of operation pixels in which an image defect does not occur is determined. Specifically, the correction processing part 23 determines the array of the operation pixels so that the screen angle and the screen period are different from the operation pixel angle and the operation pixel period by predetermined values or more, and the occurrence of the image defect such as the moire is prevented.

As stated above, in the image processing device 20, there is a specific rule for the operation (insertion and deletion) of pixels. That is, the interval of operation of pixels at each line, a pixel movement amount (offset amount) at a next line, the number of times of repetition, and the like are parameters.

Figure 5:
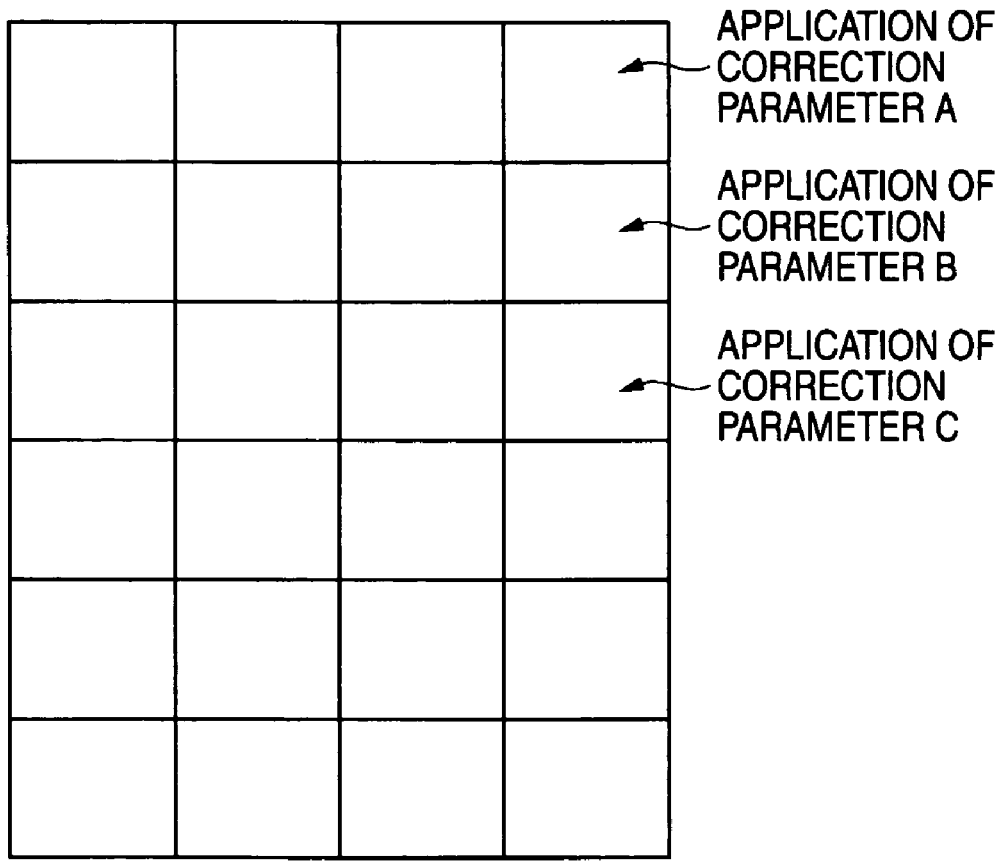
FIG. 5 is a view for illustrating a correction processing according to the exemplary embodiment of the invention.

By performing the operation as stated above, the enlargement or reduction of the image becomes possible. However, by doing this alone, the deformation (distortion) of the image generated in the transfer part or the fixing part as stated above can not be dealt with since the whole image data is merely uniformly enlarged or reduced. Then, in the image processing device 20, further, as shown in FIG. 5, a page (an image) is divided into plural areas, different correction parameters (the number of operation pixels, arrangement parameter of pixels, etc.) are applied to the respective areas, and the way of performing the deformation is changed for the respective areas. Different correction amounts and different pixel arrangement parameters may be applied to each of the plural areas. This may be changed according to the correction amount or independently thereof. In this exemplary embodiment, the arrangement parameter of pixels indicates the angle (correction angle) of arrangement of inserted or deleted pixels, or the like. The correction amount is the number of lines to be inserted or deleted in each area. It is assumed that the original image data here is not such low resolution data that the movement of one pixel becomes visually noticeable, but high resolution data of, for example, 2400 DPI or higher.

Next, specific examples of the correction processing performed in the correction processing part 23 will be described.

Figure 20:
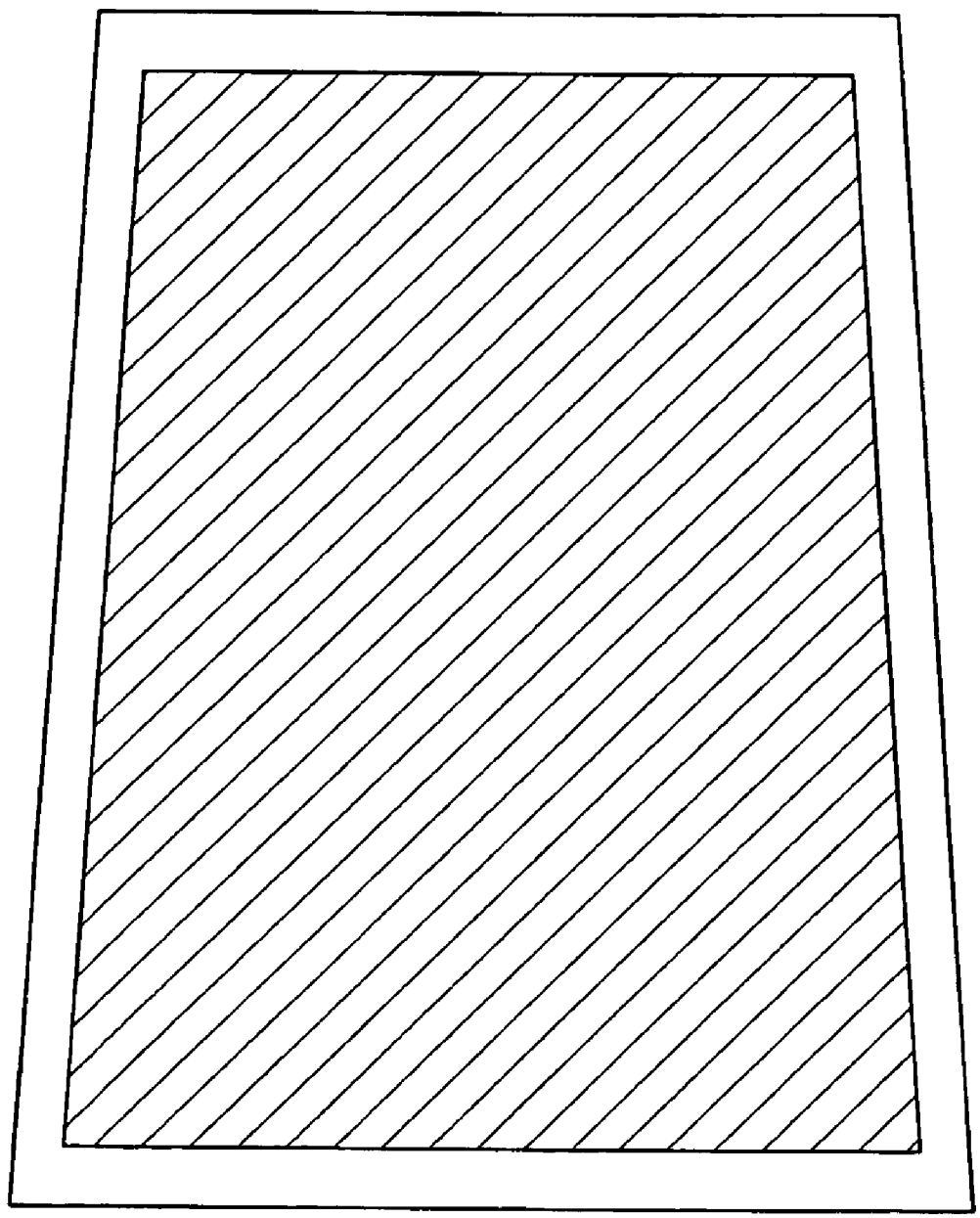
FIG. 20 is a view showing an example of sheet deformation in the fixing unit.

As described before, when the toner image is fixed to the sheet by the fixing unit 19, in the case where the temperature of the fixing unit 19 is strictly different between a leading end and a trailing end of the sheet, especially in the case where the moisture content distribution of the sheet is different, there is a case where a width in the main scanning direction is changed according to a sub-scanning position. Although the deformation of the sheet is restored after the fixation to a certain degree, it is not often completely restored depending on the condition of deformation. An image on the sheet sometimes has a shape simply expanding toward the trailing end as shown in FIG. 20 in accordance with the deformation of the sheet. In the correction of such a case, as shown in FIGS. 6A and 6B, the image is divided into plural band-shaped areas extending in the main scanning direction, the amount of pixel insertion of each area is gradually increased, and a shift is made in the main scanning direction, so that the deformation of the image is performed. Incidentally, FIG. 6B is a view in which a part of FIG. 6A is enlarged.

The way of dividing the image may be such that a difference in length between the leading end and the trailing end of a deformed image outputted without correction is divided by the increase amount of one pixel and the division number may be determined, or the division number may be adjusted by increasing or decreasing an amount (the number of pixels) to be increased for each area. The increase amount of the pixel is previously stored and may be adjusted as the need arises. The pixel operation positions in adjacent areas may be shifted so that the influence of the pixel operation is not given to each other. With respect to the operation position in each area, each area is uniformly divided by the number of times of operation and the operation position may be determined. Alternatively, the area is divided by the maximum value of the number of times of operation in the areas, and the operation position may be changed on the basis of this in the areas adjacent to each other.

Figure 7:
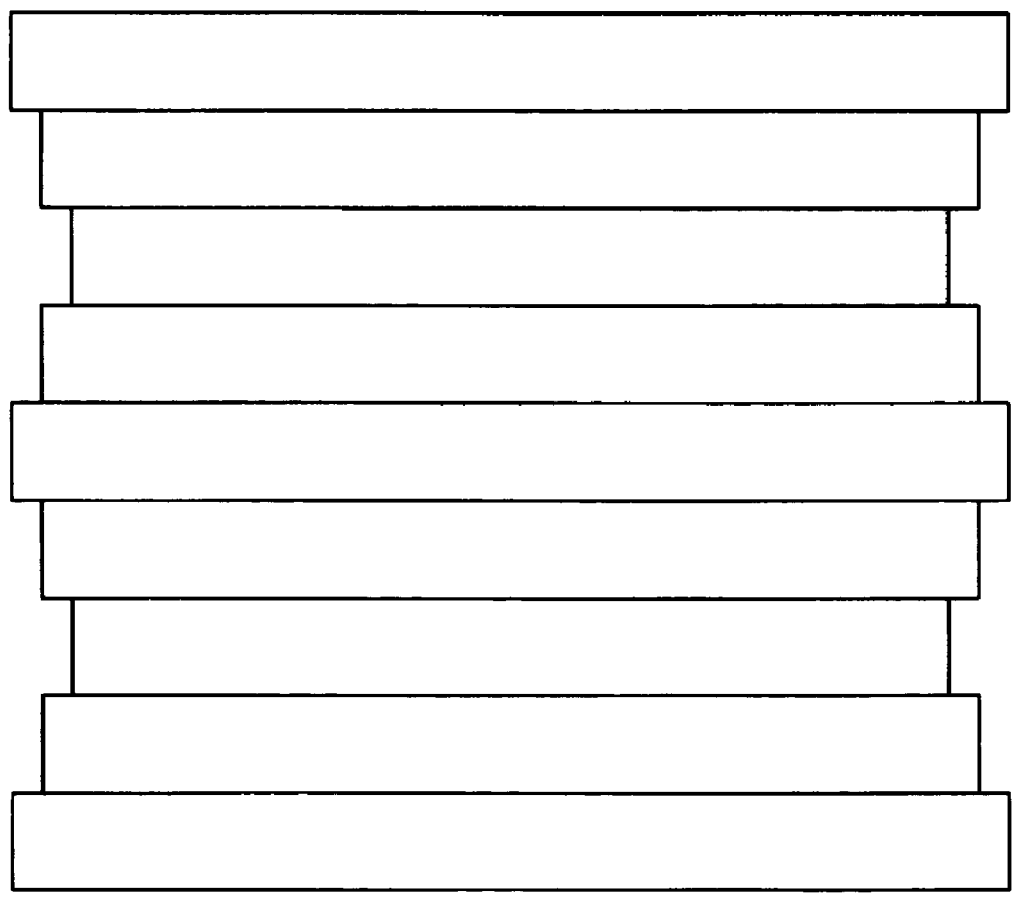
FIG. 7 is a view for illustrating a correction processing to deal with an image deformation in a fixing unit.
Figure 8B:
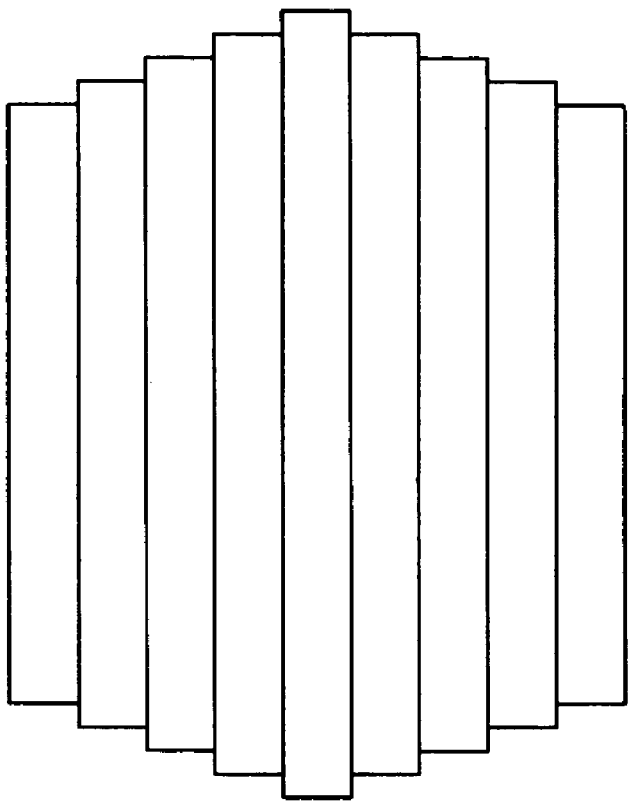
FIGS. 8A and 8B are views for illustrating a correction processing to deal with an image deformation in a fixing unit.
Figure 8A:
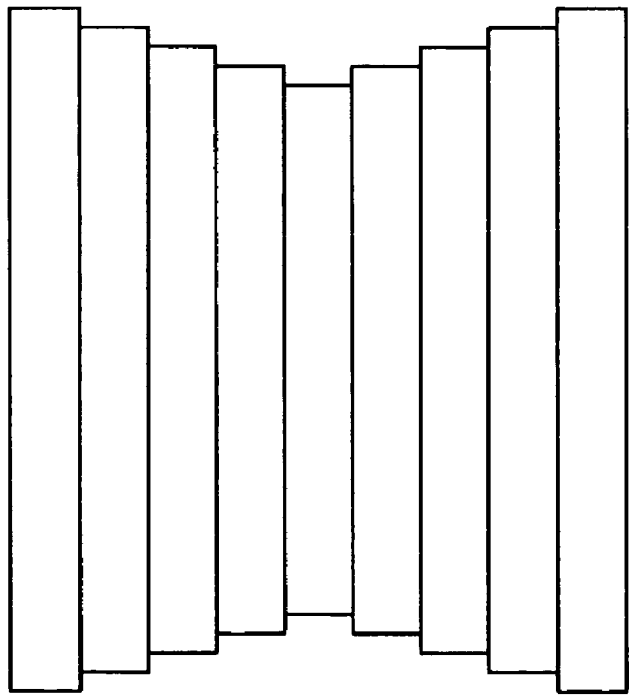
Figure 21B:
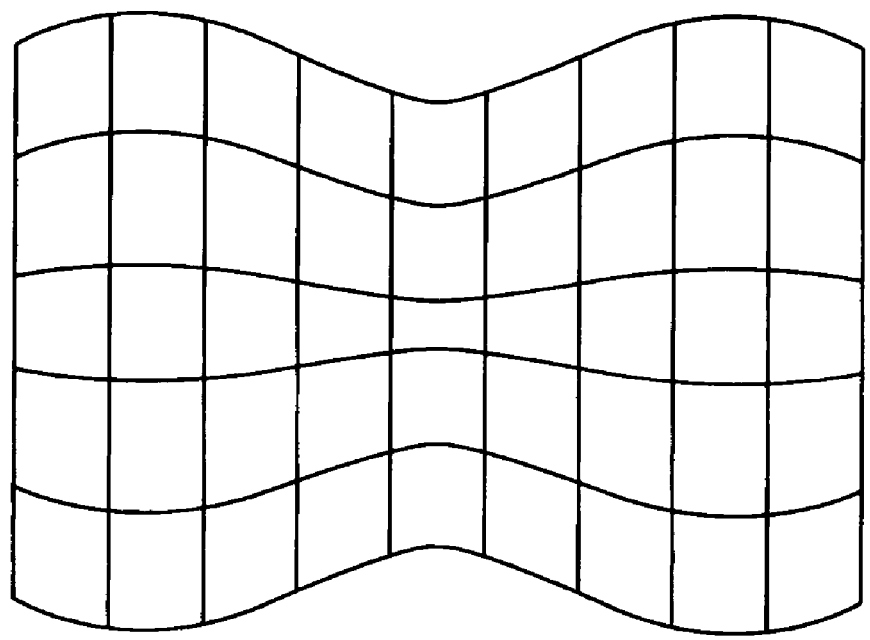
FIGS. 21A and 21B are views showing examples of image deformation in the fixing unit.

When the deformation of the sheet causes cockles due to the eccentricity of a roll, an image formed on the sheet is also deformed corresponding to the pitch of the roll as shown in FIG. 21B. The case as stated above can also be dealt with in such a manner that as shown in FIG. 7, an area is divided, and the insertion or removal of pixels is performed corresponding to the roll pitch. Depending on the way of division, a correction as shown in FIG. 8A or 8B is also possible.

Figure 9:
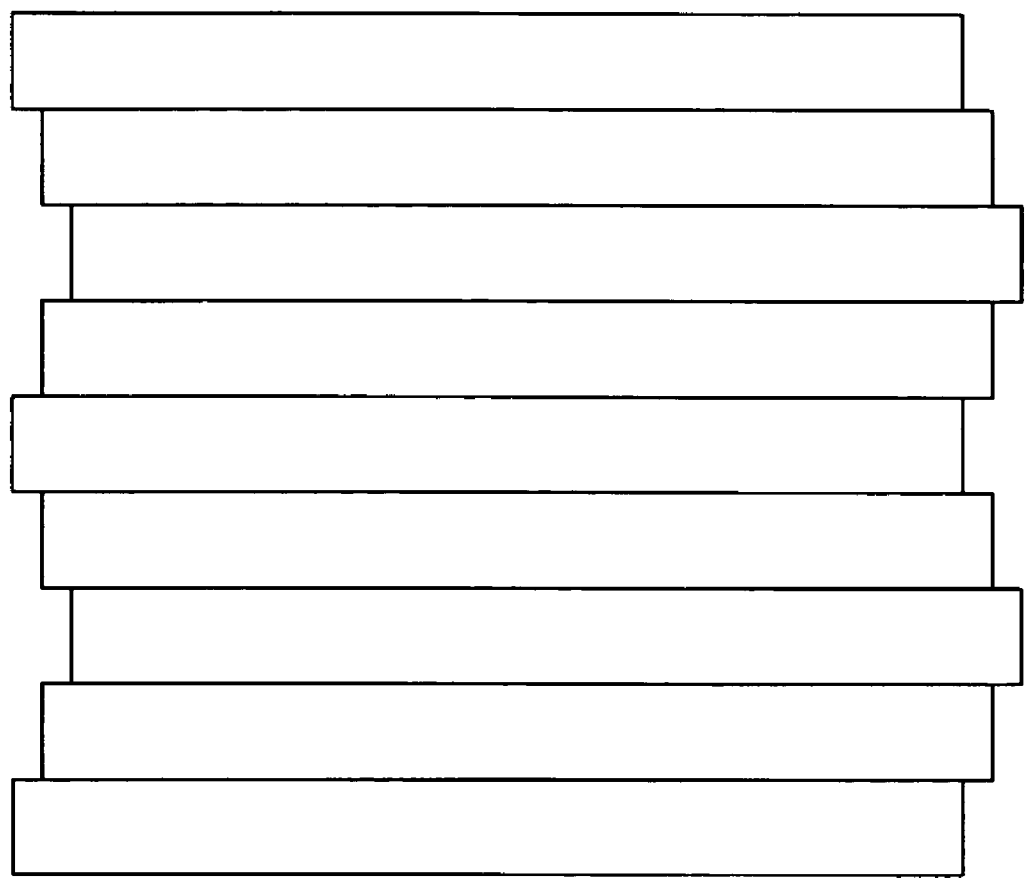
FIG. 9 is a view for illustrating a correction processing to deal with an image deformation in a fixing unit.
Figure 21A:
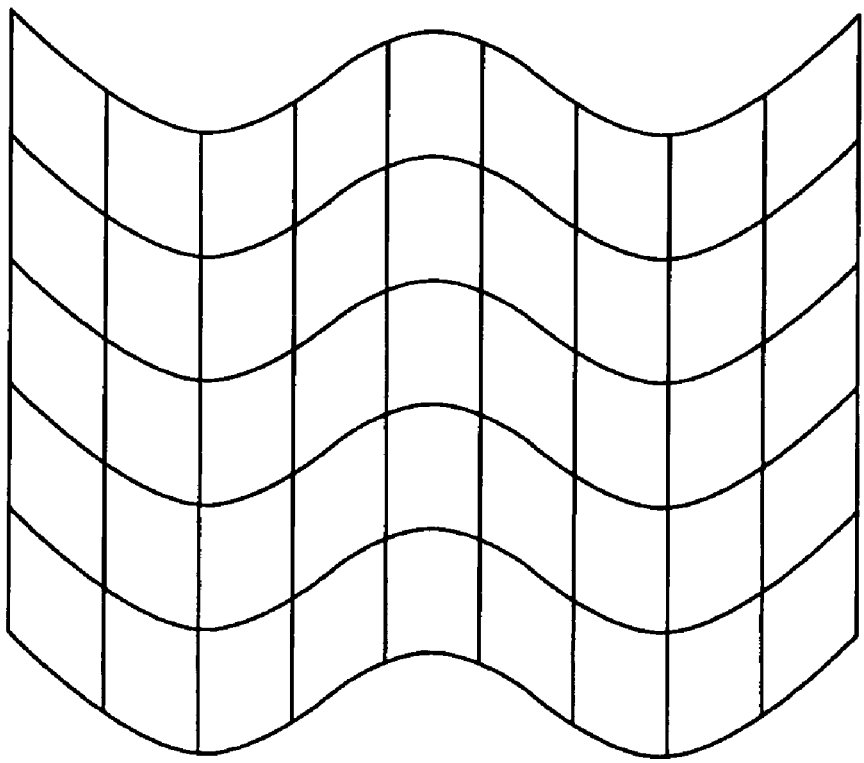

In the example where the sheet cockles, as shown in FIG. 21A, the direction of the distortion is oriented right and left in turn. In this case, the magnification is not changed, and as shown in FIG. 9, a suitable number of white pixels are inserted into the first portion on the scanning line for each area, and the translation is performed for each area, so that the correction becomes possible.

Figure 10:
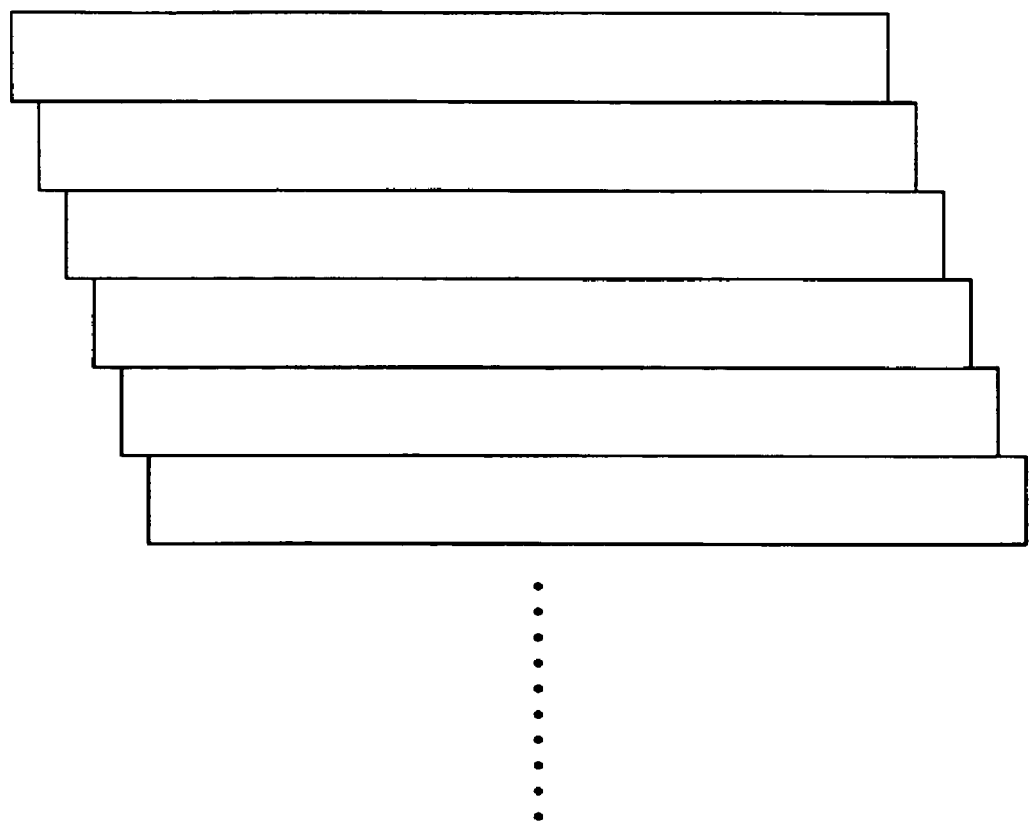
FIG. 10 is a view for illustrating a correction processing to deal with an image deformation due to skewing.

Although the image data is deformed into a parallelogram by the skewing of the belt as described before, also in this case, correction can be performed by the same method. That is, as shown in FIG. 10, the number of white pixels inserted into the first portion on the scanning line is gradually increased for each area, and the translation in each area is gradually performed, so that the correction becomes possible.

Figure 18:
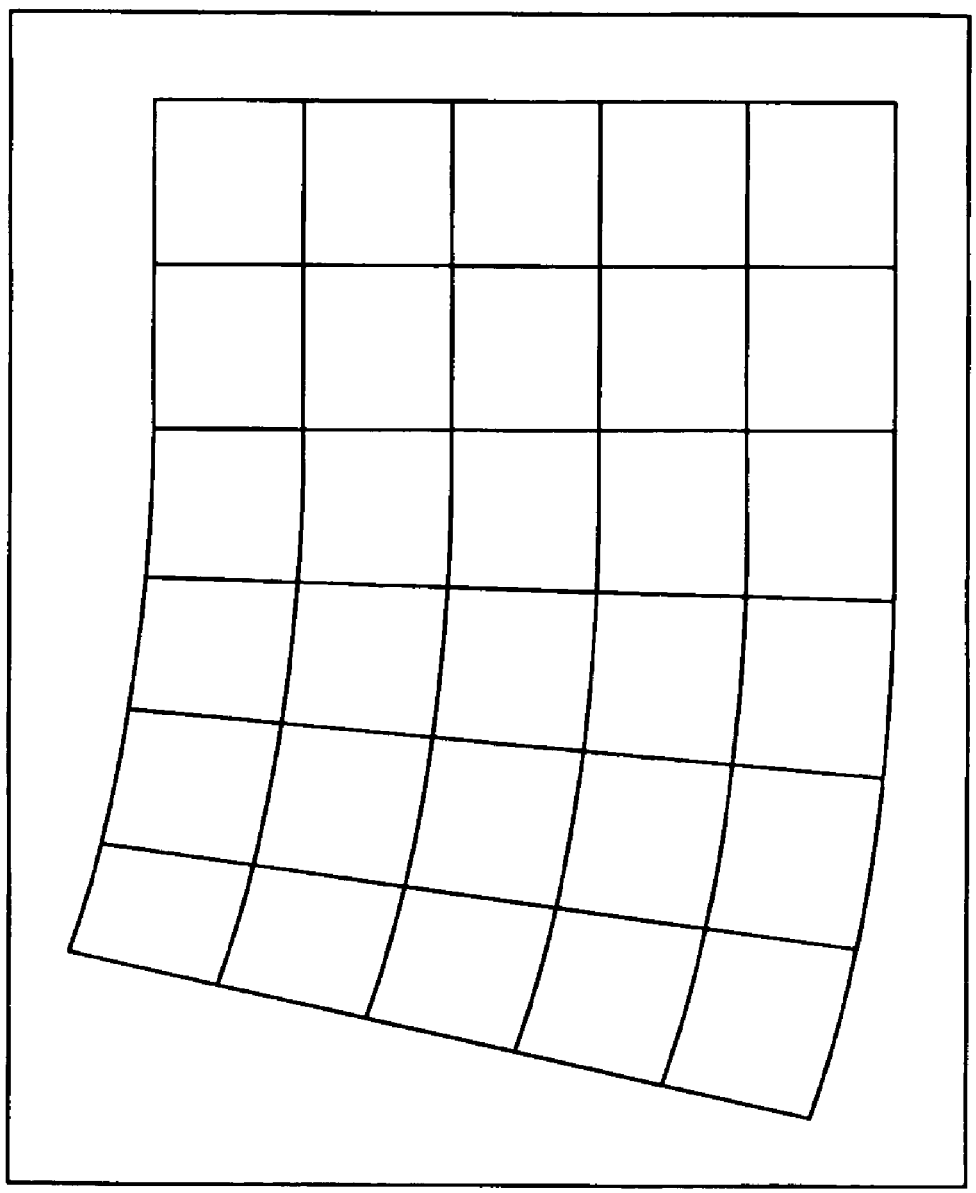
FIG. 18 is a view showing an example of an image distorted by rotation of a sheet in the second transfer part.
Figure 19:
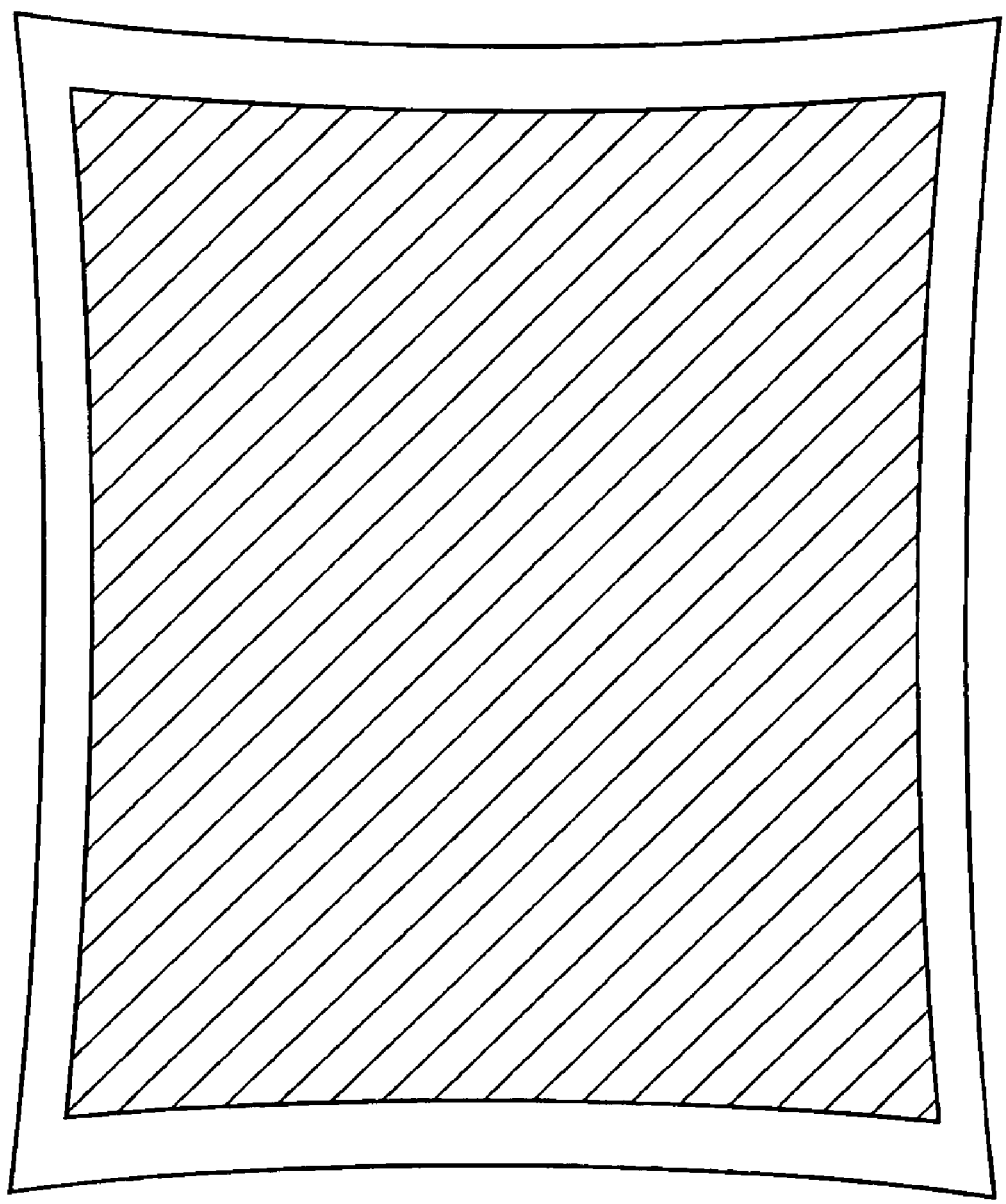
FIG. 19 is a view showing an example of sheet deformation in a fixing unit.

On the other hand, in the rotation of the sheet caused by the second transfer, differently from the foregoing case, the deformation of the image becomes complicated. As illustrated in FIG. 18, a defect occurs in which the image becomes a sector shape by the rotation, and the length in the sub-scanning direction is different between one end and the other end in the lateral width direction. In order to correct this, it is necessary to perform the correction at two phases.

Figure 11:
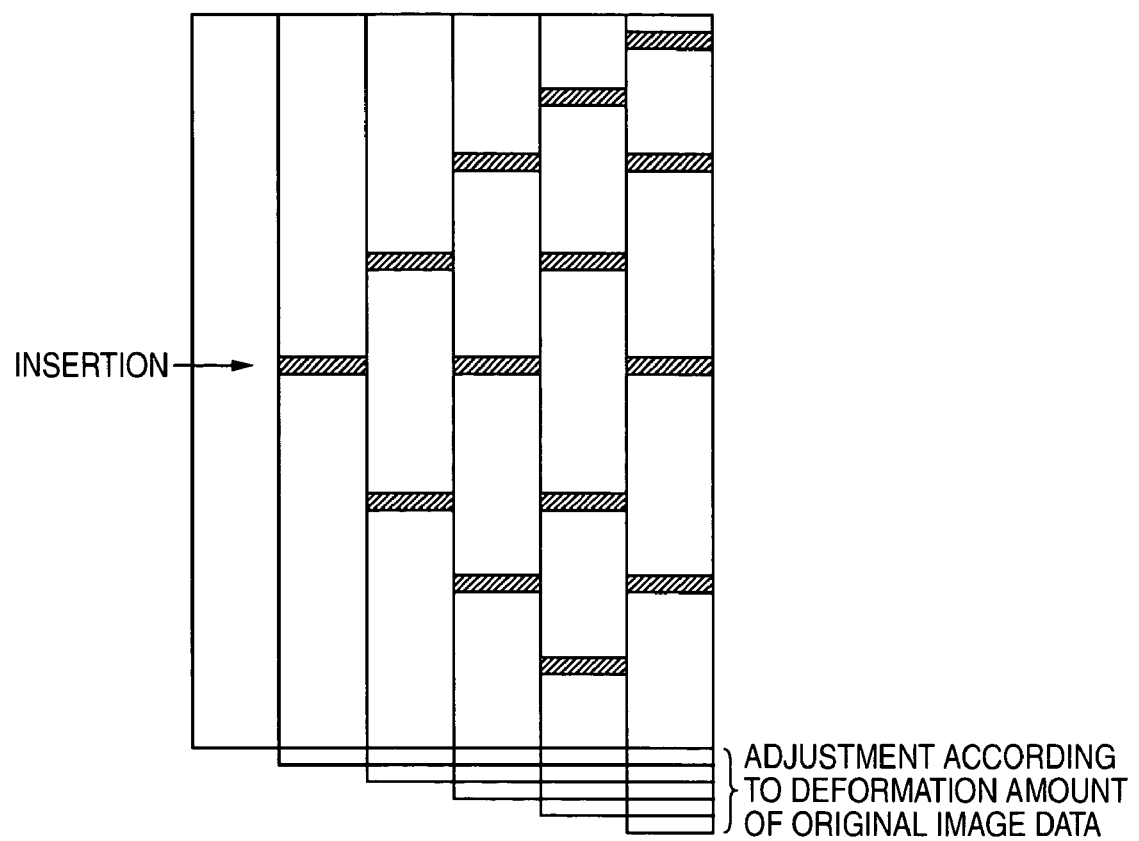
FIG. 11 is a view for illustrating a correction processing to deal with an image deformation due to transfer rotation.

First, after the transfer, since the length in the sub-scanning direction is different between the one end and the other end, at the first phase, it is necessary to change the length in the sub-scanning direction in the original image data. In order to change the length in the sub-scanning direction, setting of sub-scanning direction magnification becomes necessary. However, in the normal setting of sub-scanning direction magnification, the operation amount is constant over the sheet width. Here, an image is divided into plural band areas extending in the sub-scanning direction, and the setting of sub-scanning direction magnification is changed for each area so that the correction is performed. At the setting of sub-scanning direction magnification, intervals at which lines are inserted, the number of lines to be operated, pixel operation timing and the like are set. Specifically, for example, in order to lengthen the one end as compared with the other end, as shown in FIG. 11, the number of positions at which lines are inserted is increased for each divided area, and the correction is performed while the number is gradually increased, for example, 0 in the first area, one in the next area, two in the further next area, and so on. The areas to be operated may be every alternate ones. A difference between the one end and the other end is previously obtained, it is divided by the line interval to calculate the number of necessary lines, and the number is made to be capable of being gradually inserted. The number of divided areas, and the operation line in the divided area can be arbitrarily changed. Incidentally, in the example shown in the figure, although the correction is performed only by insertion, the correction can also be performed by deletion. For example, the correction may be performed such that the left half of the image is deleted, and in the right half, the lengths at the one end and the other end are made equal to each other by insertion.

Next, specific examples at the time when the number of lines is increased will be described.

Figure 12D:
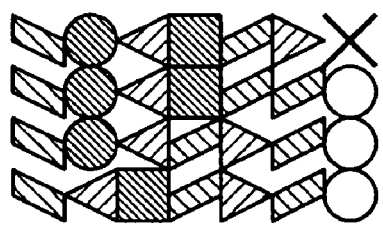
FIGS. 12A to 12D are views for illustrating the details of correction processing to deal with the image deformation due to the transfer rotation.
Figure 12C:
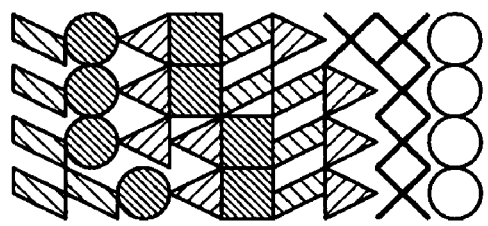
Figure 12B:
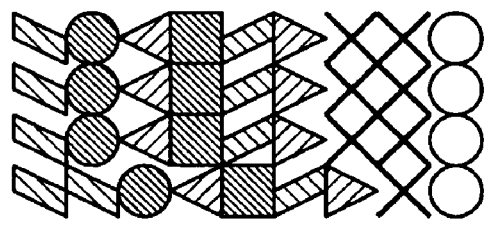
Figure 12A:
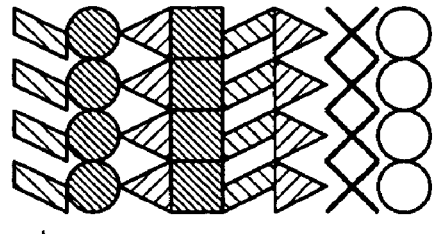

FIGS. 12A to 12D are views for illustrating the details of a method for increasing the number of lines. FIG. 12A shows a portion of the original image data to which a line is added, FIGS. 12B and 12C show image data in which pixels are increased by one line, and FIG. 12D shows image data in which pixels are decreased by one line.

As shown in FIG. 12B, with respect to the line as the reference, in the next (second) line, a part of pixels is made to be the same as in the reference line, and the remaining pixels are made the original pixels of the second line. Also in the third line, a pixel from the second line remains as it is, and the remaining pixels are made the original pixels. In this way, the pixels are gradually shifted, and in the last line to be operated, the line is copied and the number of lines is increased. However, when the number of lines is increased in this way, the change becomes liable to be visually seen. Then, as shown in FIG. 12C, the number of pixels made to remain in the next line is increased little by little, and one line is finally increased. By doing so, the change point can be blurred away. In this case, the operation pixels are inserted obliquely, not in a vertical line.

On the other hand, when the number of lines is decreased, a line next to the reference line is made the first line, and as shown in FIG. 12D, a part of pixels of the second line is superimposed on the first line, and a part of the third line is inserted into the second line. By doing so, the lines are sequentially shifted, and the last line of the scanning object is deleted to decrease the number by one line. Also at this time, similarly to the case of the increase, the pixels are shifted little by little.

Figure 13:
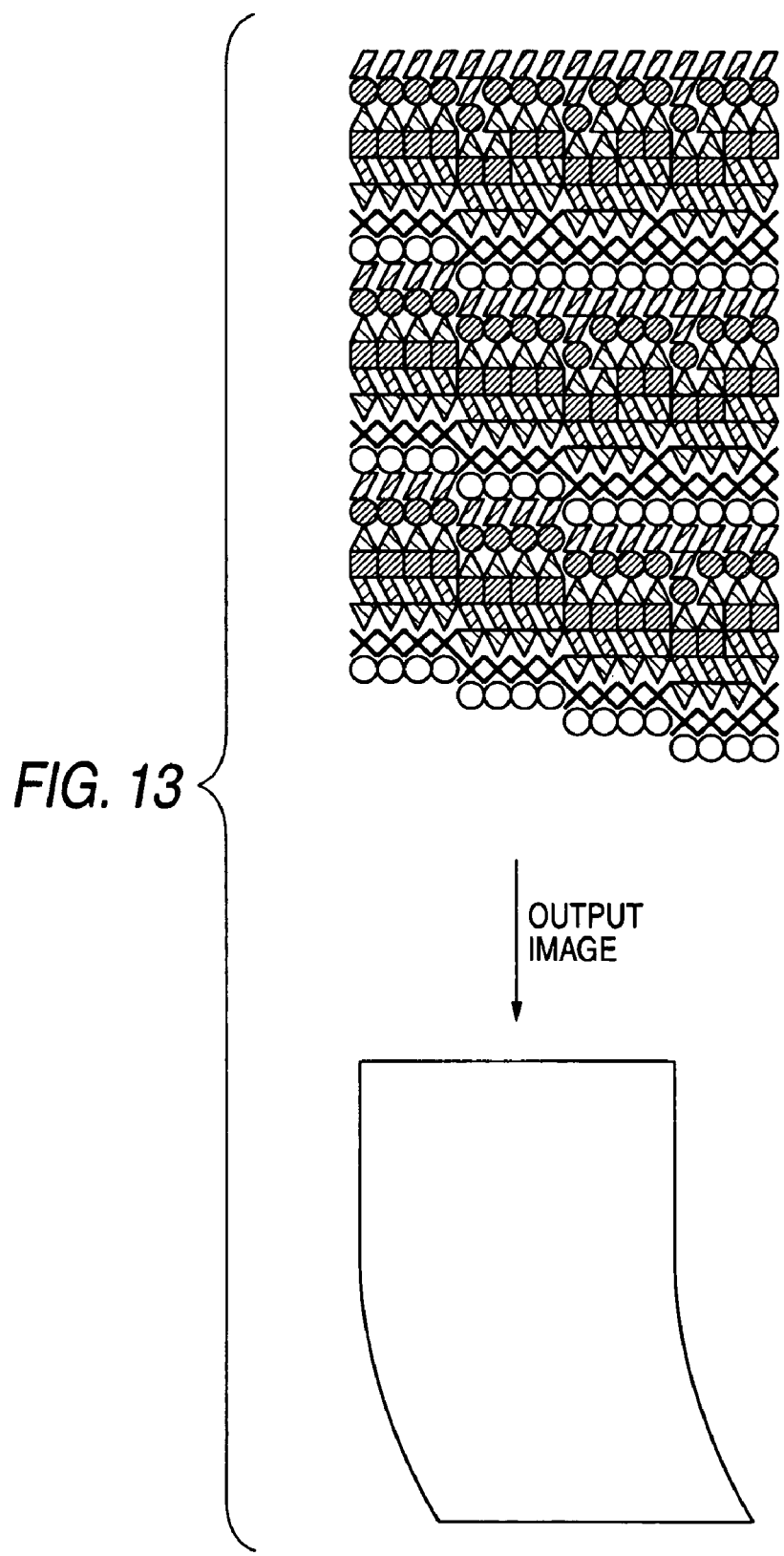
FIG. 13 is a view for illustrating a correction processing at a first stage to deal with the image deformation due to the transfer rotation.

By performing the operation as stated above, the original image data becomes a trapezoid in which the length is different between the one end and the other end. If this image is outputted as it is, since the paper is rotated in the transfer part, the lengths of the one end and the other end become equal to each other as shown in FIG. 13. However, each end is shaped into an arc. In order to make this image data rectangular, a further correction is required.

Figure 14:
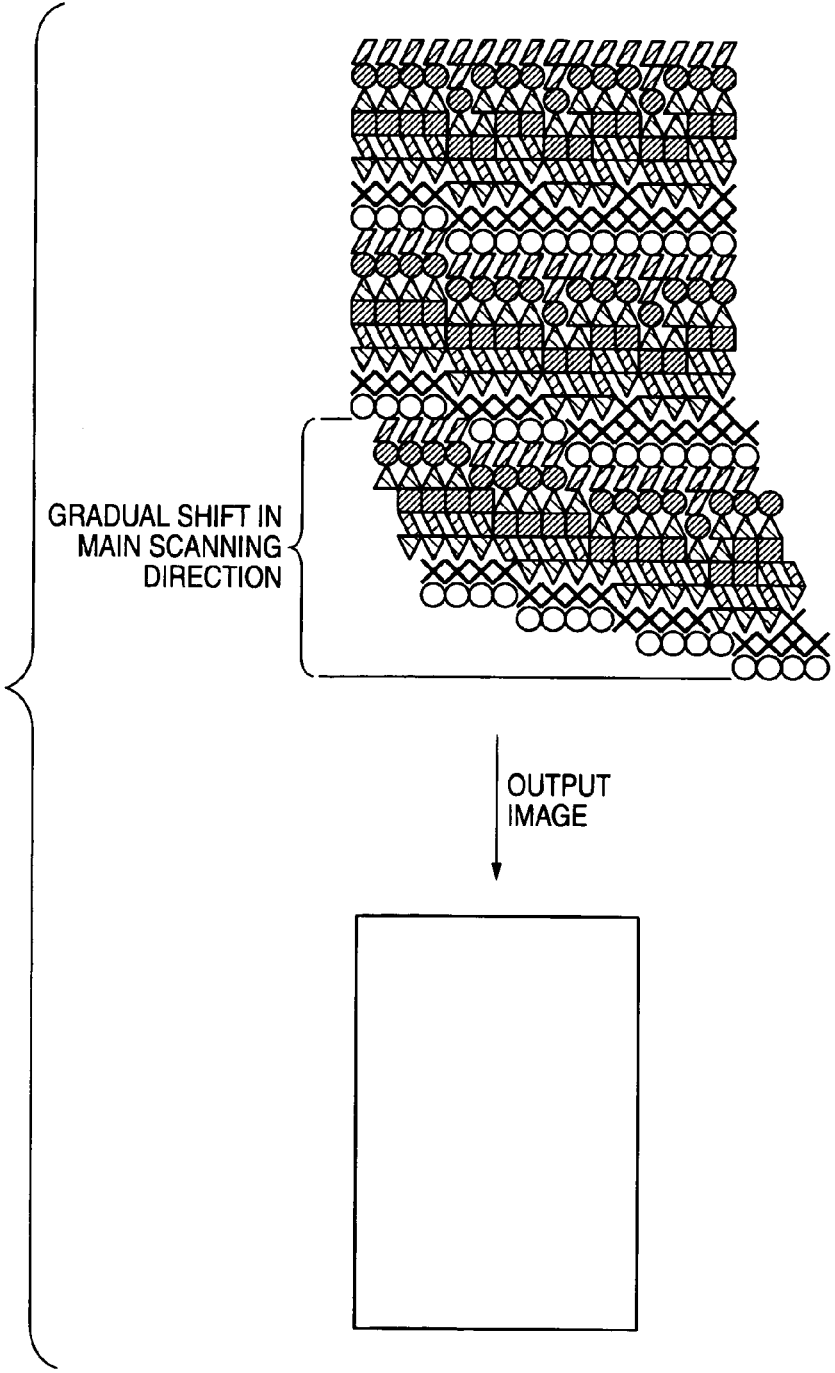
FIG. 14 is a view for illustrating a correction processing at a second stage to deal with the image deformation due to the transfer rotation.
Figure 15A:
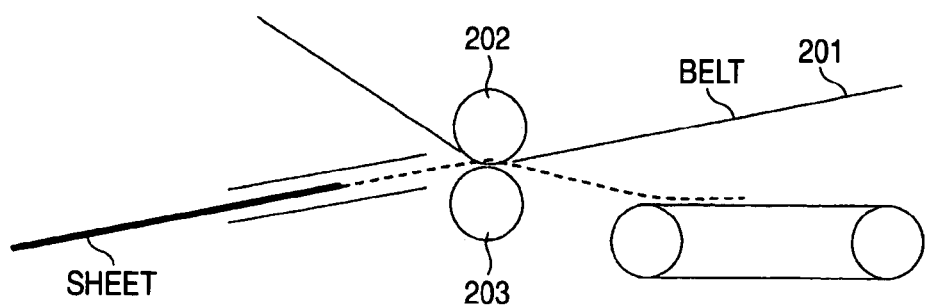
FIGS. 15A and 15B are views for illustrating a second transfer mechanism.
Figure 15B:
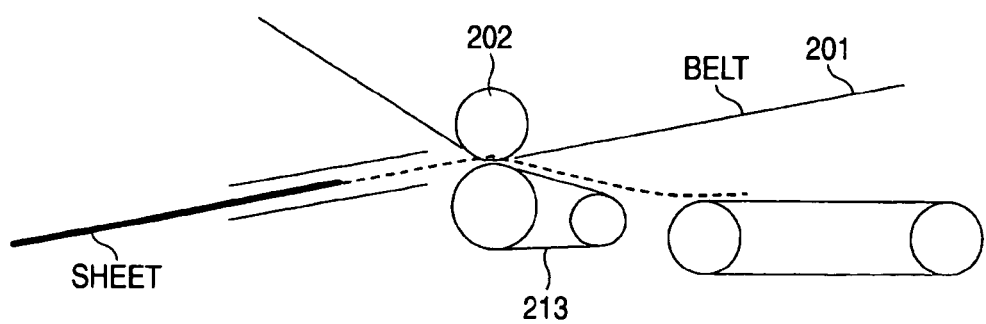
Figure 16A:
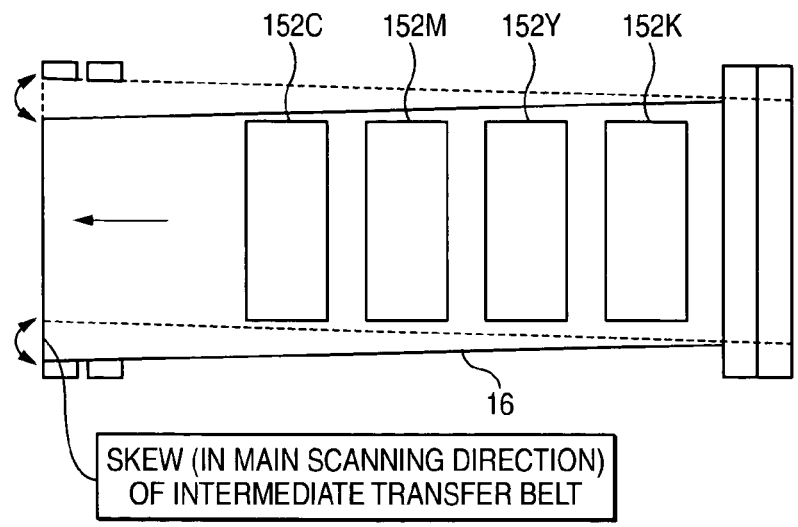
FIGS. 16A and 16B are views for illustrating an image defect due to belt skewing in a first transfer part.
Figure 16B:
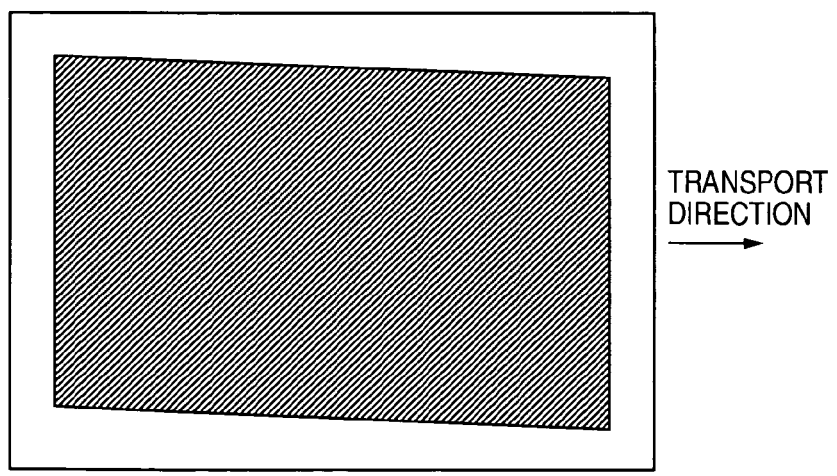
Figure 17:
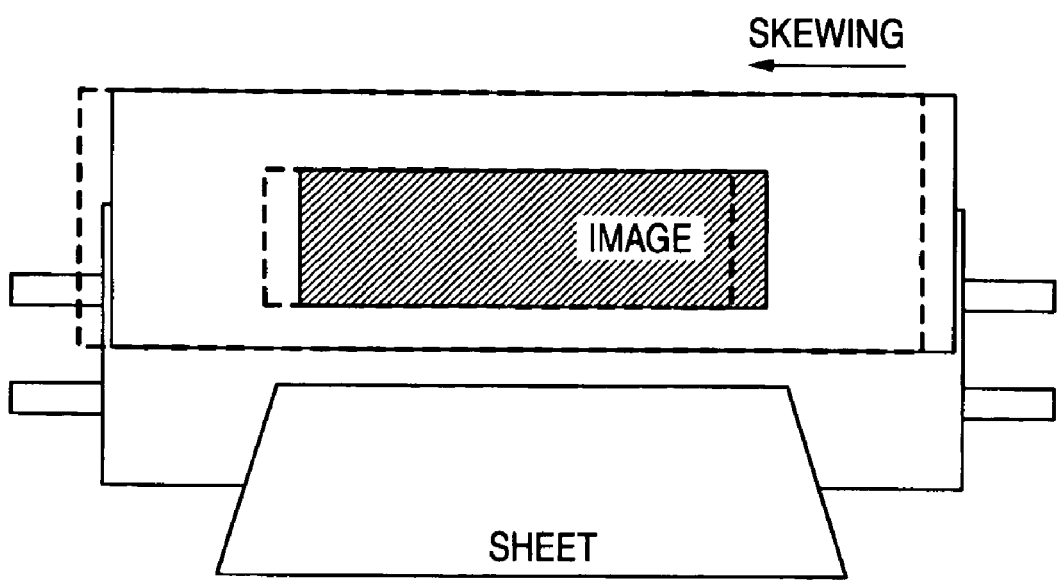
FIG. 17 is a view for illustrating belt skewing in a second transfer part.

Thus, at a second phase, the foregoing trapezoid is sequentially shifted in the main scanning direction from the halfway position in the sub-scanning direction. The method of shifting it in the main scanning direction is similar to the method illustrated in FIG. 9. The amount of shift is obtained in such a manner that a shift amount of the original image data is previously obtained, and the amount is divided by the pixel interval. Finally, when the original image data as shown in FIG. 14 is formed, even if the sheet is rotated by transfer, the image data can be eventually made rectangular. If the amount of one-time shift in the main scanning direction is decreased, interference with the screen can be made smaller.

As stated above, in the multi-phase correction, the change of magnification and the shift of pixels are often combined.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a screen processing part that performs a screen processing on image data;
    a correction processing part that divides the image data subjected to the screen processing into a plurality of regions, determines a different correction parameter for each of the regions in response to a characteristic of the screen processing, and performs the correction processing;
    an image formation part that forms an image based on the image data subjected to correction processing:
    a distortion detection part to detect a distortion of an output image, the distortion of the image is generated in a transfer part or a fixing part; and
    wherein the correction processing part determines a division number of the regions and the correction parameter as to cancel the distortion detected by the distortion detection part.

2. The image forming apparatus according to claim 1, wherein the characteristic of the screen processing is at least one of a period and an angle of the screen processing, and
    the correction processing part selects at least one of a correction period and a correction angle which does not interfere with the at least one of the period and the angle of the screen processing.

3. The image forming apparatus according to claim 2, wherein the correction processing part performs a pixel operation for each line to perform the correction processing, and
    determines a pixel arrangement parameter to make a pixel operation period different from the period of the screen processing.

4. The image forming apparatus according to claim 2, wherein the correction processing part performs a pixel operation for each line to perform the correction processing, and
    determines a pixel arrangement parameter to make a correction angle different from the angle of the screen processing.

5. The image forming apparatus according to claim 1, wherein the plurality of regions are a plurality of band-shaped regions extending in a main scanning direction.

6. The image forming apparatus according to claim 1, wherein the plurality of regions are a plurality of band-shaped regions extending in a sub-scanning direction.

7. The image forming apparatus according to claim 1, wherein the correction processing part combines a plurality of correction processings with different correction parameters to perform the correction processing.

8. The image forming apparatus according to claim 7, wherein the correction processing part combines reduction or enlargement of the regions and movement of the regions to perform the correction processing.

9. The image forming apparatus according to claim 8, wherein the correction processing part displaces positions to be operated in adjacent regions from each other.

10. An image forming method comprising:
- detecting distortion in an image outputted based on image data;
- performing screen processing on the image data;
- dividing the image data into a plurality of regions;
- determining a pixel arrangement parameter corresponding to a characteristic of the screen processing for each region and a different correction amount corresponding to the detected distortion;
- correcting the image data subjected to the screen processing using the pixel arrangement parameter and the different correction amount;
- forming an image based on the corrected image data;
- detecting a distortion of an output image with a distortion detection part, the distortion of the image is generated in a transfer part or a fixing part; and
- determining a division number of the regions and the correction parameter with a correction processing part as to cancel the distortion detected by the distortion detection part.

11. A storage medium readable by a computer, the storage medium storing a program of instructions executable by the computer to perform a function for forming an image, the function comprising:

- detecting distortion in an image outputted based on image data;
- performing screen processing on the image data;
- dividing the image data into a plurality of regions;
- determining a pixel arrangement parameter corresponding to a characteristic of the screen processing for each region and a different correction amount corresponding to the detected distortion;
- correcting the image data subjected to the screen processing using the pixel arrangement parameter and the different correction amount;
- forming an image based on the corrected image data;
- detecting a distortion of an output image with a distortion detection part, the distortion of the image is generated in a transfer part or a fixing part; and
- determining a division number of the regions and the correction parameter with a correction processing part as to cancel the distortion detected by the distortion detection part.

* * * * *